July 14, 1964  E. E. FRASER  3,140,677
COMBINATION TOP DRESSER, SPIKER AND PLANTER
Filed Oct. 3, 1962  2 Sheets-Sheet 1

INVENTOR.
ELBERT E. FRASER
BY
ATTORNEY

July 14, 1964  E. E. FRASER  3,140,677
COMBINATION TOP DRESSER, SPIKER AND PLANTER
Filed Oct. 3, 1962  2 Sheets-Sheet 2
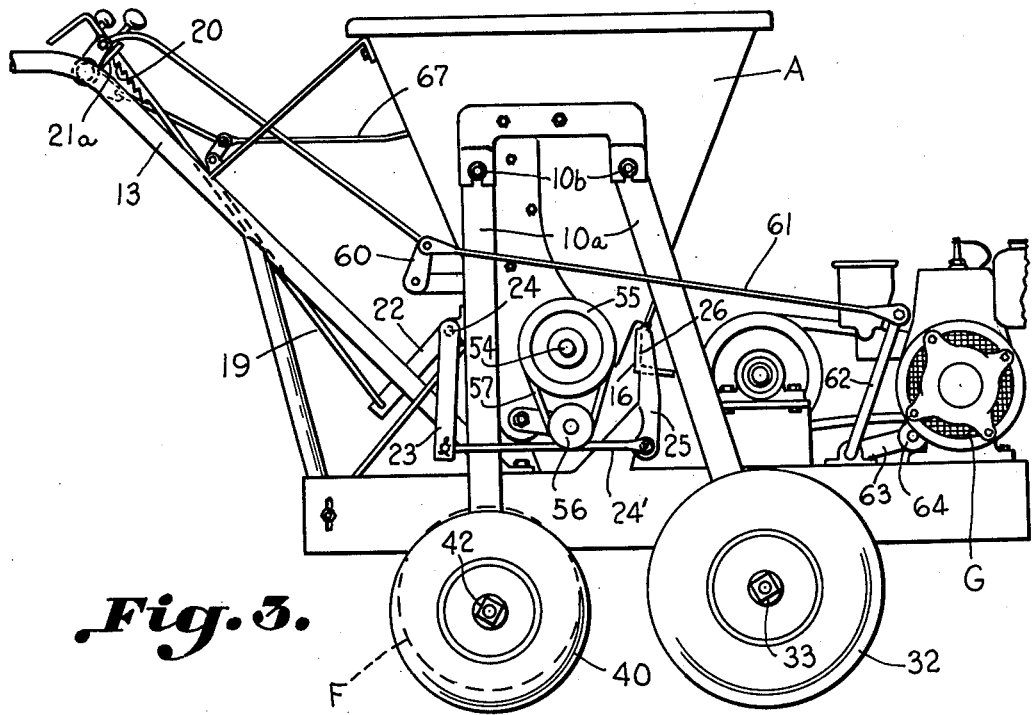
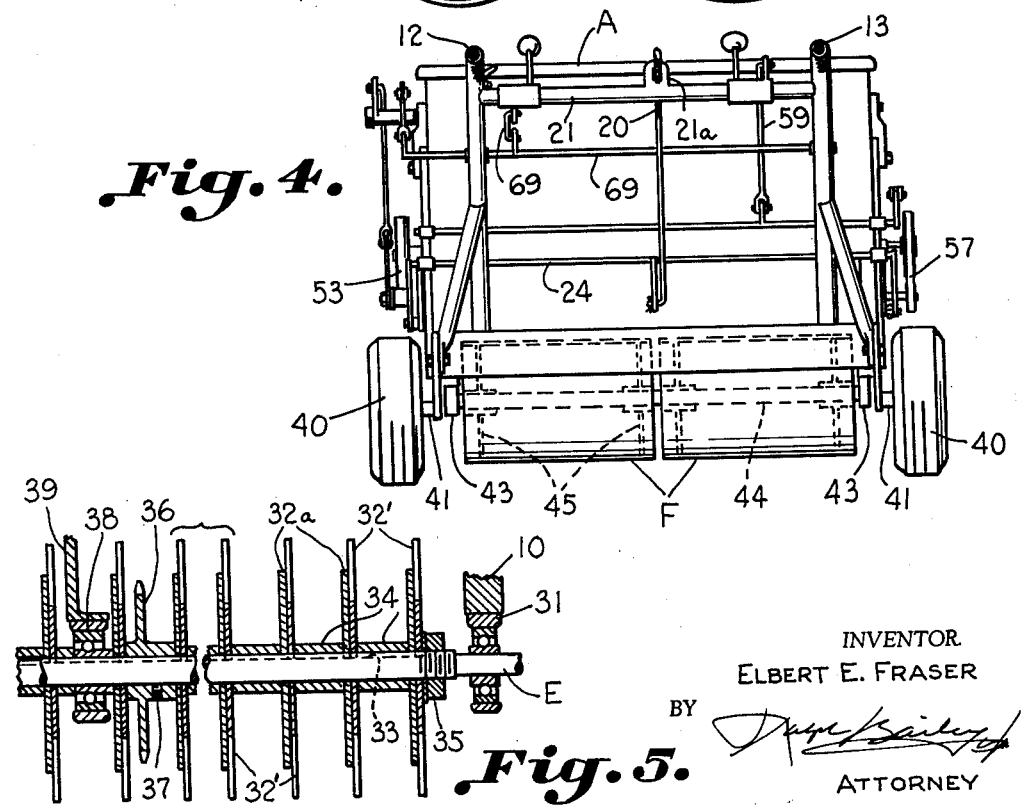
INVENTOR.
ELBERT E. FRASER
BY
ATTORNEY ＃ 3,140,677
COMBINATION TOP DRESSER, SPIKER AND PLANTER
Elbert E. Fraser, Travelers Rest, S.C.
(Box 761, Brevard, N.C.)
Filed Oct. 3, 1962, Ser. No. 228,195
1 Claim. (Cl. 111—8)

This invention relates to a device for spreading topsoil spiking and planting which is especially useful on golf courses, estates, parks, public grounds and the like.

Heretofore, the work of the subject invention was accomplished largely by hand. Top dressing equipment was available in the form of manually operated spreaders and the like. With the present device it is possible to top dress exceptionally large areas through power operated equipment while obtaining a more nearly even distribution of topsoil. It is also possible through the subject invention to simultaneously carry out a spiking and top dressing operation through the use of the motor driven equipment. The normally tedious planting of grass stolons and the like has been greatly simplified, since once the grass stolons have been spread, it is possible to plant and top dress them in one operation.

Accordingly, it is an important object of this invention to provide an improved power driven spreader in which a more nearly even distribution of the top dressing material is obtained.

Another important object of the invention is to provide a power driven machine capable of simultaneously spiking and top dressing a relatively large area.

Another object of the invention is to provide a power driven machine for automatically planting and top dressing grass stolons.

Another object of the invention is to provide an automatic device capable of adjustment for spreading relatively evenly a measured amount of topsoil.

Another object of the invention is to provide a device for planting grass stolons in which the planting phase is followed by top dressing and compaction in one sequence of operation.

Still another important object of the invention is to provide a power driven device in the form of a combination spiker and spreader in which the spreader is pulled by the spiker.

The construction designed to carry out the invention will be hereinafter described, together with other features thereof.

Figure 1:
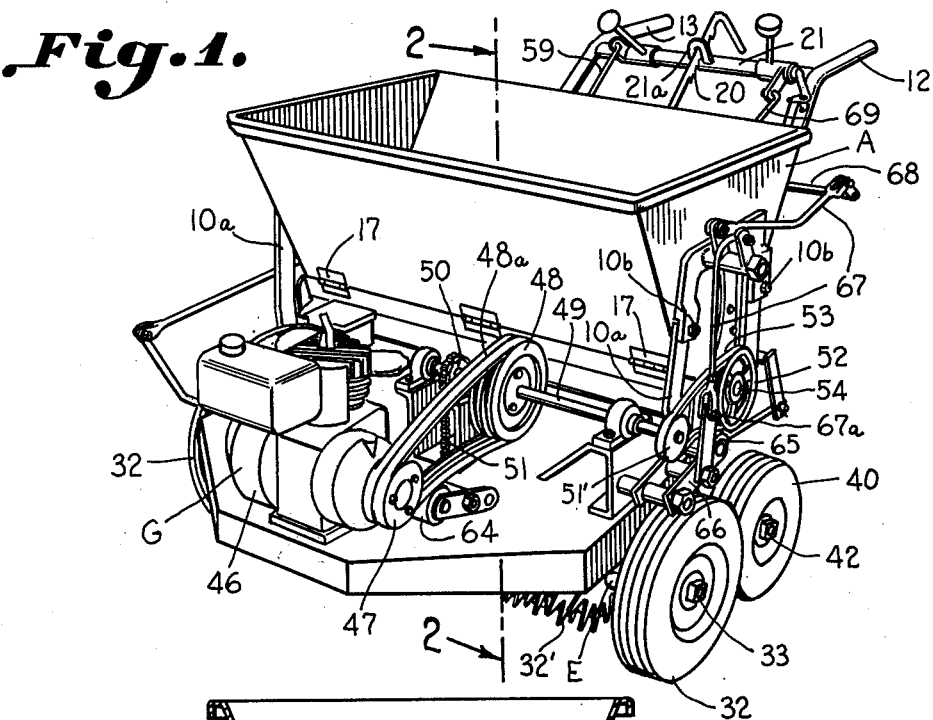
Figure 2:
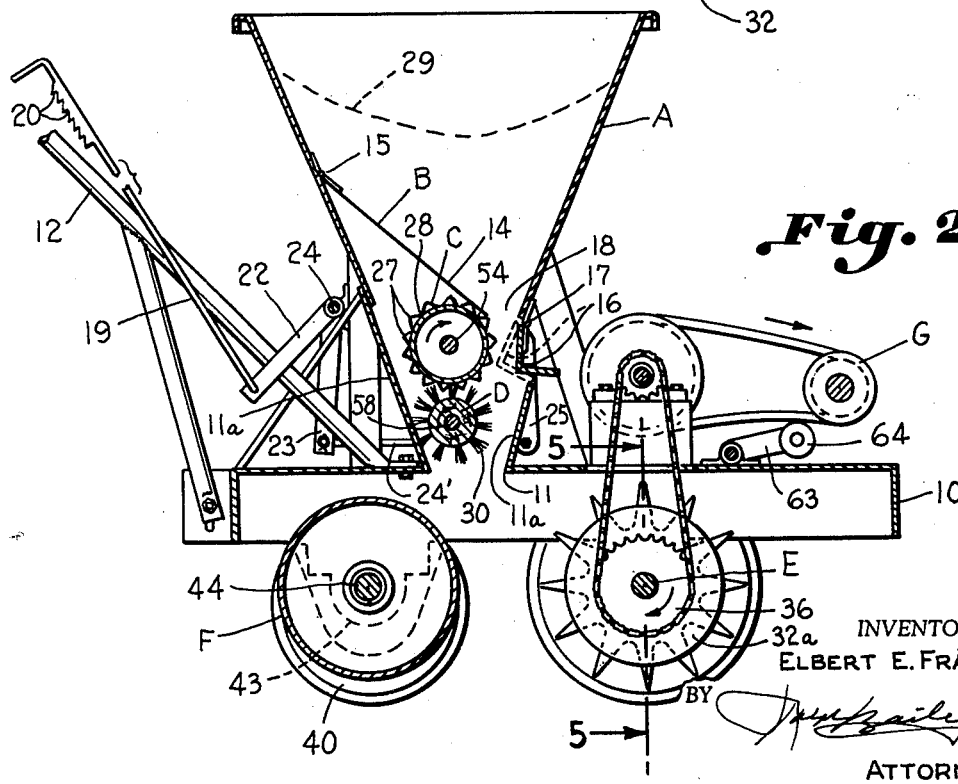

The invention will be more readily understood from a reading of the following specification and by reference to the accompanying drawings forming a part thereof, wherein an example of the invention is shown and wherein:

FIGURE 1 is a perspective view illustrating a device constructed in accordance with the present invention, FIGURE 2 is an enlarged transverse sectional view taken on the line 2—2 in FIGURE 1, FIGURE 3 is an enlarged side elevation looking from the left-hand side in FIGURE 1, FIGURE 4 is a rear elevation of the device illustrated in FIGURE 1, and FIGURE 5 is an enlarged transverse sectional view taken on the line 5—5 in FIGURE 2.

The drawings illustrate a vehicle for spreading top dressing material and the like. A vertical hopper A is carried in an intermediate portion of the vehicle and means B for agitating the top dressing material is carried within the hopper. The hopper A has an opening in the lower portion thereof, and a fluted roll C is carried adjacent the lower portion of the hopper receiving top dressing material therefrom. A roll D carrying a plurality of bristles engaging the fluted roll so that the bristles receive top dressing material from the fluted roll and positively remove top dressing material therefrom, is positioned adjacent the fluted roll C. A transverse shaft E is carried by the vehicle forwardly of the hopper with spiking means carried thereby. Transversely disposed roller means F are carried by the vehicle rearwardly of the hopper, and means G are provided for driving said shaft E, the fluted roll C, and the roll D carrying the bristles.

The hopper A is carried by a horizontal frame 10 which has an opening 11 therein to receive the topsoil discharged from the hopper to be deposited ahead of the compaction rollers F. The frame 10 has a standard 10a on each side for removably supporting the hopper A which may be removed by loosening the nuts 10b. The hopper A is received by the downwardly converging members 11a and 11b which define the opening 11 and form a downward extension of the hopper. The frame 10 also serves as a platform for supporting the various driving means and is itself supported by wheeled elements. A pair of handle bars 12 and 13 are suitably mounted adjacent the rear of the frame for the convenience of the operator in handling the vehicle when in operation. The handle bars also carry various control mechanism for operating the driving mechanism, and for controlling the feed mechanism for the topsoil, as well as the means controlling the amount of topsoil fed from the hopper A.

The means B for agitating the top dressing material is carried within the hopper A and includes an inclined plate 14 which is hinged at one end as at 15 to one of the downwardly converging walls of the hopper A. The free end of the plate 14 remote from the hinge means 15 rests upon the fluted roll C. A wall 16 extends downwardly from the wall of the hopper A opposite the hinge means 15 and is itself hinged as at 17. The wall 16 may be moved inwardly, as illustrated by the dotted line position of the wall 16 in FIGURE 2, to restrict the opening 18 defined by the free end of the plate 14, the fluted roll C and the wall 16. This adjustment is accomplished by manipulation of the rod 19. The rod 19 may be selectively positioned by engaging one of the notches 20 carried by the upper portion of the rod within a stop 21a carried by the horizontal bar 21 positioned across the upper portion of the handles 12 and 13. Referring especially to FIGURE 3, it will be noted that upward movement of the rod 19 will cause the link 22 to be raised, causing movement of the link 23 toward the left-hand side of FIGURE 3. The links 22 and 23 are fixed together and pivoted as at 24. The rod 24' pulls the link 25 to the left in FIGURE 3, and results in inward movement of the adjustable wall 17 which is fixed to the upper portion of the link 25 as at 26.

The fluted roll C carries protuberances 27 which define fluted poritons 28 therebetween. Successive contacts by the protuberances cause vibration of the plate 14 and agitation of the top dressing material 29 carried within the hopper A. The top dressing material 29 is fed by the fluted roll C in predetermined measured amounts into the opening 18 defined between the fluted roll and the opposite wall of the hopper A, and the downward extension thereof, in the form of the hinged wall 17. The roll D is positioned below the fluted roll C within a lower extension of the hopper A adjacent the opening 11 within the frame 10. The roll D carries projections preferably in the form of nylon bristles 30 which serve to remove top dressing material impinging upon the fluted portions 28 of the roll C. The bristles also serve to violently agitate the top dressing material passing through the opening 11 so as to distribute same evenly ahead of the compaction roller F.

A transverse shaft E carried by suitable pillow block bearings 31 carried by each side of the frame 10 may removably position a wheel 32 adjacent the ends thereof. The wheels may be removed by disengaging the nuts 33 which serve to fasten the wheels onto the shaft E. The shaft E normally carries a plurality of spiking elements 32' which are keyed to the shaft E by the keyway 33. Suitable spacers 34 are provided for maintaining the spacing of the spiker elements 32' upon the shaft. The assembly is fixed on one end by a nut 35 received by a threaded portion of a shaft, and on the other end by a sprocket 36 which is fixed by the setscrew 37 upon the shaft E. An intermediate bearing 38 for supporting the shaft E is suspended from the frame 10 by the hanger 39.

Referring especially to FIGURES 2 and 4, it will be noted that rear wheels 40 for the frame 10 are removably carried upon stub shafts 41 suspended from each side of the frame 10. The wheels 40 may be removed by removing the nuts 42 confining the wheels upon the stub shafts 41. The pillow block bearings 43 are suspended from the frame adjacent each side thereof between the stub shafts 41 and support a transverse shaft 44 which carries inserts 45 supporting the rollers F. The roller means F includes two sections so as to provide a differential action facilitating turning of the vehicle. The roller means F also act to spread the weight of the vehicle and the top dressing material so as to avoid tracks as would be made by the wheels.

When the device is used as a planter for grass stolons discs 32a may be inserted adjacent the spiker elements 32' to limit their penetration into the ground. In such an operation the grass stolons are spread and then traversed by the vehicle. The spiker and discs press the stolons into the earth and then the top soil is spread and then the roller means compact the topsoil. If desired a sulky may be used in any of these operations by attaching same to the rear of the vehicle.

The driving means G includes a motor 46, a gasoline type being illustrated. The motor 46 drives a pulley 47, which in turn drives the pulley 48 carried by the countershaft 49. A sprocket 50 is carried by the countershaft which drives a chain 51 for driving the shaft E through the sprocket 36. The countershaft E also carries a pulley 51' which drives a pulley 52 through the belt 53 for driving the fluted roll shaft 54. The fluted roll shaft 54 drives a pulley 55 (FIGURE 3), which in turn drives the pulley 56 through the belt 57. This results in the driving of the bristle roll shaft 58 at an increased rate of speed due to the driving ratio between the pulleys 55 and 56.

The various driving means just described above are controlled through various linkage mechanisms which operate suitable clutch means. The link 59 moves the pivoted link 60 to move the rod 61 for adjusting the link 62 to move the link 63 to engage and disengage the roller 64 with the belt 48a. The engagement of the roller 64 takes up the slack in the belt 48a resulting in a driving connection being made for the countershaft 49, which drives the shaft E, the fluted roll C and the bristle roll D. It will be noted that the driving of the shaft E propels the vehicle forwardly whether by the wheels 32 or the spiker elements 32'. Since the driving belt 53 is normally slack, the means delivering the topsoil from the hopper is normally disengaged so that it is possible to carry out a spiking operation without delivering topsoil. When carrying out such an operation the hopper A may be removed as described above in order to reduce the weight of the vehicle. Since the driving belt 53 is driven off of the countershaft 49, it is also necessary that the driving means be connected for propelling the vehicle forward in order for the means delivering topsoil to be operable. Referring especially to FIGURES 1 and 4, it may be seen that the belt 53 is engaged by the roller 65 which is carried by the link 66. The link 66 is operated through the linkage 67, which has pivotal connection with the shaft 68. The shaft 68 is in turn operated by the linkage 69 carried by the shaft 21. The link 67 may be disconnected by removing the fastening 67a when removing the hopper A.

While a preferred embodiment of the invention has been described using specific terms, such description is for illustrative purposes only, and it is to be understood that changes and variations may be made without departing from the spirit or scope of the following claim.

What is claimed is:

In a vehicle for planting grass stolons and for spreading top dressing material and the like upon the ground, the improvement including, a vertical hopper carried in an intermediate portion of the vehicle, said hopper having an opening in the lower portion thereof, a roll having circumferentially spaced protuberances carried within the hopper adjacent the lower portion thereof receiving top dressing material therefrom, a plate carried within the hopper, the upper end of said plate being pivoted with respect to the hopper, the lower end of said plate being engaged by the protuberances agitating the plate, a roll carrying a plurality of cristles carried within the hopper engaging the roll having protuberances so that the bristles receive top dressing material from the roll having protuberances and positively remove top dressing material therefrom, a transverse shaft carried by the vehicle forwardly of the hopper, wheels removably positioned upon such shaft, spaced spiking means carried by said shaft intermediate the wheels, spaced discs carried between spiking means limiting their penetration into the ground when said wheels are removed and for pressing grass stolons and the like into the ground prior to receiving the top dressing material, means driving said shaft and the roll having protuberances, means driving the roll carrying the bristles from the roll having protuberances at an increased speed relative to the speed of the roll having protuberances, transversely disposed roller means carried by the vehicle rearwardly of the hopper, whereby the vehicle is pulled forwardly by the spiking means when the wheels are removed and the top dressing material spread evenly upon the planted stolons.

References Cited in the file of this patent

UNITED STATES PATENTS

| | | |
|---|---|---|
| 686,648 | Bryan | Nov. 12, 1901 |
| 858,508 | Goldman | July 2, 1907 |
| 867,451 | Umrath | Oct. 1, 1907 |
| 1,517,791 | McAndrew | Dec. 2, 1924 |
| 2,026,460 | Cobb | Dec. 31, 1935 |
| 2,260,110 | Blohm | Oct. 21, 1941 |
| 2,710,117 | Fritz | June 7, 1955 |
| 2,770,938 | Kiernan | Nov. 20, 1956 |
| 2,864,294 | Pearson | Dec. 16, 1958 |
| 2,887,075 | Linkogel | May 19, 1959 |

FOREIGN PATENTS

| | | |
|---|---|---|
| 9,720 | Great Britain | Mar. 30, 1894 |